United States Patent [19]

Inden et al.

[11] Patent Number: 4,679,589

[45] Date of Patent: Jul. 14, 1987

[54] FLUID PRESSURE CONTROLLING SOLENOID VALVE

[75] Inventors: Masahiro Inden, Toyoake; Kazutaka Kuwana, Toyota; Nobuyasu Nakanishi, Toyota; Noboru Noguchi, Toyota, all of Japan

[73] Assignees: Aisin Seiki Kabushiki Kaisha; Toyota Jidosha Kabushiki Kaisha, both of Japan

[21] Appl. No.: 909,389

[22] Filed: Sep. 19, 1986

[30] Foreign Application Priority Data

Sep. 19, 1985 [JP] Japan .................................. 60-207421

[51] Int. Cl.$^4$ ........................................... F15B 13/044
[52] U.S. Cl. .................................... 137/596.17; 91/31; 91/444; 251/117; 303/119
[58] Field of Search ................ 137/596.17; 91/31, 444; 251/117; 303/119

[56] References Cited

U.S. PATENT DOCUMENTS

| | | | |
|---|---|---|---|
| 3,565,111 | 2/1971 | Pearson | 137/596.17 |
| 4,337,794 | 7/1982 | Yamanaka et al. | 137/596.17 |
| 4,561,701 | 12/1985 | Fujii et al. | 303/119 |

Primary Examiner—Gerald A. Michalsky
Attorney, Agent, or Firm—Sughrue, Mion, Zinn, Macpeak and Seas

[57] ABSTRACT

A fluid pressure controlling solenoid valve is disclosed for producing an oil pressure which drives a brake pressure controlling piston in a manner such that an brake oil pressure applied to the brakes associated with wheels in response to the depression of a brake pedal is adjusted to a low value in order to prevent a high slip ratio of wheels with respect to a road surface and to a high value when the slip ratio is reduced. A switching solenoid valve is assembled on the upper end face of an intermediate member formed of a magnetic material and having a first fluid path extending therethrough from its upper to its lower end face for selectively connecting the first fluid path with a reduced pressure input port and a high pressure input port. A switching solenoid valve which opens or closes the connection between the first fluid path and the output port is assembled on the lower end face of the intermediate member. The solenoid valve has an orifice of a reduced diameter which maintains a communication between the first fluid path and the output port.

6 Claims, 3 Drawing Figures

FLUID PRESSURE CONTROLLING SOLENOID VALVE

FIELD OF THE INVENTION

The invention relates to a solenoid valve which changes the direction of flow and flow rate of a fluid, and more particularly, though not limited thereto, to a brake pressure controlling solenoid valve for use in an antiskid unit onboard a vehicle which prevents wheel locking when wheels slip relative to a road surface as a brake is operated.

PRIOR ART

An antiskid unit comprises a brake pressure regulator valve assembly disposed between a wheel brake and a brake master cylinder which produces a fluid pressure depending on the depression of a brake booster for supplying the fluid pressure produced by the brake master cylinder either directly, in decompressed form or in boostered form to the wheel brake, a fluid pressure controlling solenoid valve for producing a fluid pressure and supplying it to the brake pressure regulator valve assembly in order to drive a brake pressure regulating piston of the assembly, and a fluid source unit which supplies a high pressure fluid to a second port (high pressure port) and recovering the fluid from a first port (low pressure port) of the solenoid valve. The fluid pressure controlling solenoid valve includes a pair of solenoid valves, the first and the second port, and a third port (output port) which supplies a controlling fluid pressure to a brake pressure controlling chamber of the brake pressure regulator valve assembly, thus producing a fluid pressure at the third port which depends on the energization of the pair of the solenoid valves.

An example of the antiskid unit and the fluid pressure controlling solenoid valve of the type mentioned above is disclosed in detail in Japanese Laid-Open Patent Application No. 192,657/1984, which is schematically shown in FIG. 3. Referring to FIG. 3, when a brake pedal 11 is not depressed, a brake pressure adjusting piston 7 of a brake pressure regulator valve assembly 10 assumes the position shown, urging a valve piston 4 to the right. Oil 23 from an oil tank 21 is supplied to a brake pressure controlling chamber 6 of the valve assembly 10 through a pressure switching valve MG1 and an on/off solenoid valve MG2, by means of a devoted pump 22 which is driven by an associated engine. A first cutoff valve 1 including a valve seat 1a and a valve element 1b and a second cutoff valve 2 including a valve seat 2a and a valve element 2b both remain open since the piston 4 is prevented from moving to the left as a result of abutment against the right end of a piston 7 by the resilience of a compression spring 5. As the brake pedal 11 is depressed, a master cylinder 12 produces an oil pressure, which is transmitted through a duct 14 to a front wheel cylinder 16, and is also transmitted through a duct 13, the assembly 10 and a duct 15 to a rear wheel cylinder 18, thus applying a braking effort to front wheels 17 and rear wheels 19.

A microcomputer 20 estimates a vehicle speed from the rotational speed of all the wheels, and then calculates a slip ratio of the rear wheels on the basis of the vehicle speed and the rotational speed of the rear wheels. When the slip ratio exceeds a given value, it is very likely that the wheels would appreciably slip relative to a road surface to cause a locking of the wheels in response to the application of the braking effort. Accordingly, the solenoid valve MG1 is changed from a position supplying a high pressure to another position supplying a low or reduced pressure. As a consequence, a low pressure prevails in the brake pressure controlling chamber 6, causing the piston 7 to move to the left. This movement reduces the oil pressure within the duct 15, thus reducing the braking effort which is applied to the rear wheels 19. This allows the rotation of the rear wheels 19 to be resumed. When the slip ratio of the rear wheels decreases below the given value, the microcomputer 20 either closes the solenoid valve MG2 (to its holding position) in order to avoid an excessive reduction in the pressure or changes the solenoid valve MG1 to a booster position which allows a high pressure to be supplied in order to increase the braking effort. When the holding position is assumed, the piston 7 stops to move, thus substantially interrupting a reduction or an increase in the oil pressure within the duct 15. When the booster action is adopted, the piston 7 moves to the right, increasing the oil pressure within the duct 15. In response to the reduction in the pressure, the first cutoff valve 1 restricts a communication between the ducts 15 and 13 to a communication through a small opening 3 in order to enhance the pressure reducing effect, and the second cutoff valve interrupts the communication between the ducts 15 and 13, thus further enhancing the pressure reducing effect.

In this manner, a fluid pressure controlling solenoid valve FPCV can be established in one of three modes, including the pressure reduction (outputting a reduced pressure), holding (holding the pressure) and booster (outputting a high pressure) action. In the fluid pressure controlling solenoid valve FPCV, the solenoid valves MG1 and MG2 are constructed as a unitary unit by juxtaposing them so that the output port of the valve MG1 and the input port of the valve MG2 are located at a same level. A relatively large and rigid base member supports these solenoid valves in an integral manner and includes a valve seat which opens or closes the low pressure port of the valve MG1 and another valve seat which opens or closes the output port of the valve MG2, and thus it will be seen that the fluid pressure controlling solenoid valve FPCV occupies a relatively large space for its provision.

SUMMARY OF THE INVENTION

It is a first object of the invention to provide a compact fluid pressure controlling solenoid valve, and a second object is to provide a compact fluid pressure controlling solenoid valve which can be established in one of four modes including a rapid pressure reduction (a high flow rate and a reduced pressure), a slow pressure reduction (a low flow rate and a reduced pressure), a slow booster (a low flow rate and a high pressure), and a rapid booster (a high flow rate and a high pressure) mode.

Above objects are accomplished in accordance with the invention by a fluid pressure controlling solenoid valve comprising an intermediate member of a magnetic material having a cylindrical outer side surface and including a first valve seat disposed in the upper end face thereof at the center of the cylindrical configuration, a first fluid path located adjacent to the first valve seat and extending therethrough from the upper to the lower end face, and a second fluid path communicating with a fluid passage of the first valve seat and extending in a direction away from the center to communicate with a second port; a first end member of a magnetic material disposed above the intermediate member and having a cylindrical outer side surface and including a second valve seat disposed at the center of the cylindrical configuration and a first port communicating with a fluid passage of the second valve seat; a first cylindrical plunger enclosure member disposed between the intermediate member and the first end member and having its one end secured to the upper end face of the intermediate member and its other end secured to the first end member, the first plunger enclosure member having a plunger receiving space which communicates with the first and the second valve seat and the first fluid path, the center axis of the enclosure member passing through the first and the second valve seat; a first plunger of a magnetic material disposed within the first plunger enclosure member to divide its interior into a pair of spaces, and including a first valve member disposed opposite to the first valve seat to close the opening thereof, a second valve member disposed opposite to the second valve seat to close the opening thereof and a first bypass path providing a communication between the pair of divided spaces; first spring means disposed within the first plunger enclosure member for urging the first plunger in a direction along the center axis of the enclosure member; and a first electrical coil disposed around the first plunger enclosure member. A first yoke of a magnetic material is disposed laterally outward of the first electrical coil and has its one end secured to the intermediate member while its other end is secured to the first end member. When the first electrical coil is not energized, the first plunger assumes its upper position as it is urged by the first spring means, and the second valve member closes the opening of the second valve seat, thus allowing the first fluid path to communicate with the second port through a passage including the second port, the second fluid path, the first valve seat and the first fluid path. When the first electrical coil is energized, a magnetic flux is developed passing through the intermediate member, the first plunger, the first end member, the first yoke and returning to the intermediate member, causing the first plunger to be attracted toward the intermediate member to close the opening of the first valve seat while opening the opening of the second valve seat, thus allowing the first fluid path to communicate with the first port through a passage including the first port, the second valve seat, the first bypass path and the first fluid path. In this manner, the first fluid path communicates with either the second or the first port in accordance with the deenergization or energization of the first electrical coil.

Disposed below the intermediate member is a second end member of magnetic material having a cylindrical outer side surface and including a third valve seat located at the center of the cylindrical configuration and opposite to the other surface of the intermediate member, and a third port communicating with a fluid passage of the third valve seat. Disposed between the intermediate member and the second end member is a second, cylindrical plunger enclosure member having its one end secured to the lower end face of the intermediate member and its other end secured to the second end member and having a plunger receiving space which communicates with the first fluid path and the third valve seat and having a center axis which passes through the third valve seat. Received within the second plunger enclosure member is a second plunger of a magnetic material which divides the interior of the second enclosure member into a pair of spaces and which includes a third valve member located opposite to the third valve seat to close the opening thereof, and a second bypass path which provides a communication between the pair of divided spaces. Second spring means is also disposed within the second enclosure member for urging the second plunger in a direction along the center axis of the enclosure member. A second electrical coil is disposed around the second plunger enclosure member. A second yoke of a magnetic material is disposed laterally outside the second electrical coil and has its one end secured to the intermediate member while its other end is secured to the second end member. When the second electrical coil is deenergized, the second plunger assumes its upper position as it is urged by the second spring means to open the opening of the third valve seat, allowing the first fluid path to communicate with the third port through a passage including the first fluid path, the second bypass path, the third valve seat and the third port. When the second electrical coil is energized, a magnetic flux is developed passing through the intermediate member, the second plunger, the second end member, the second yoke and returning to the intermediate member, thereby causing the second plunger to be attracted toward the second end member to close the opening of the third valve seat while closing the opening of the third valve seat. In this manner, the communication between the first fluid path and the third port which takes place through the third valve seat is interrupted. In this manner, the communication between the first fluid path and the third port is either established or interrupted in accordance with the deenergization or energization of the second electrical coil.

The fluid pressure controlling solenoid valve is constructed by a fluid path switching solenoid valve and on/off or open/close solenoid valve (as shown schematically at 100 and 200, respectively, for the solenoid valve FPCV in FIG. 2) which are aligned with each other in a vertical direction. Thus, the first end member carrying the second valve seat is disposed above the intermediate member, and the first plunger is disposed therebetween, and the second end member carrying the third valve seat is disposed below the intermediate member with the second plunger disposed therebetween. Since the intermediate member is formed with the first valve seat and the first fluid path, the lateral width of the fluid pressure controlling solenoid valve is much less than the combined width of a pair of solenoid valve disposed side by side. In addition, the intermediate member is shared by the switching solenoid valve (having an output port which represents the first fluid path) comprising the first end member, the first plunger, the first electrical coil and the first yoke, and by the open/close solenoid valve (having an input port which represents the first fluid path) comprising the second end member, the second plunger, the second electrical coil and the second yoke. Accordingly, the vertical height of the fluid pressure controlling solenoid valve is reduced than the combined height of a pair of solenoid valves stacked one above another. In other words, the fluid pressure controlling solenoid valve according to the invention represents a compact construction.

To enable four modes, including a rapid reduction, a slow reduction, a slow boostering and a rapid boostering of the brake pressure, to be established for its use in an antiskid unit, in a preferred embodiment of the invention, the second end member has an orifice of a diameter which is less than the fluid passage of the third valve seat and which communicates with the second plunger receiving space and the third port. In the preferred embodiment, if the first port is connected to a drain port of a fluid source and the second port is connected to a high pressure port of the fluid source, when the first plunger closes the first valve seat and opens the second valve seat (when the first electrical coil is energized), and when the second plunger opens the third valve seat (when the second electrical coil is deenergized), the third port (output port) communicates with the first port through a wider opening of the third valve seat, achieving a rapid rate of reduction in the pressure prevailing in the third port (rapid reduction mode). If the second plunger now closes the third valve seat (when the second electrical coil is energized), the third port communicates with the first port through the orifice of a reduced diameter, achieving a slow rate of reduction in the pressure prevailing in the third port (slow reduction mode). When the first plunger is driven to open the first valve seat and to close the second valve seat (by deenergizing the first electrical coil) and the second plunger is driven to close the third valve seat (by energizing the second electrical coil), the third port communicates with the second port through the orifice of a reduced diameter, achieving a small rate of pressure rise in the third port (slow booster mode). If the second plunger is now driven to open the third valve seat (by deenergizing the second electrical coil), the third port communicates with the second port through the wider opening of the third valve seat, achieving a rapid rate of pressure rise in the third port (rapid booster mode).

Other objects and features of the invention will become apparent from the following description of an embodiment thereof with reference to the drawings.

DESCRIPTION OF PREFERRED EMBODIMENT

Figure 1:
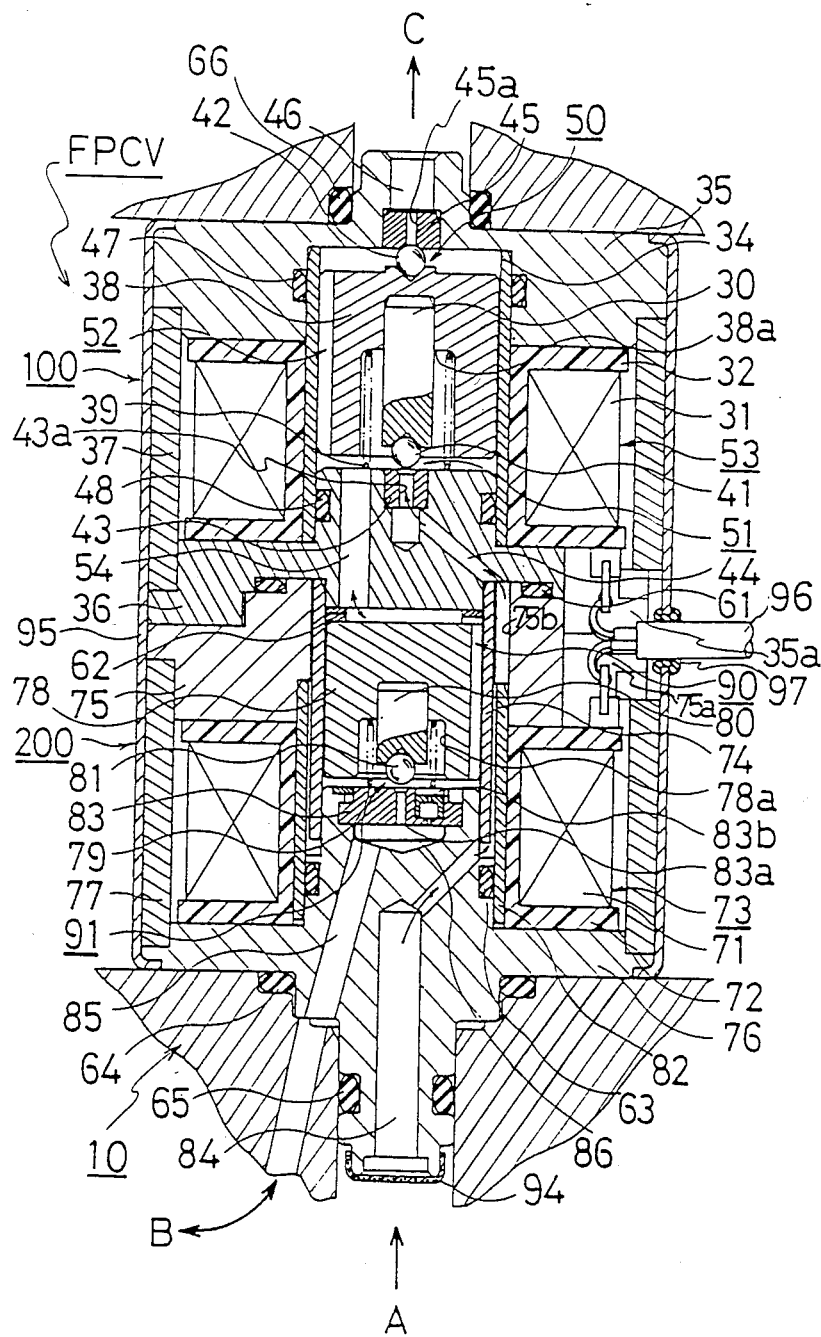
FIG. 1 is a longitudinal section of a preferred embodiment of the invention.

Referring to FIG. 1 which illustrates a preferred embodiment of the invention, a fluid pressure controlling solenoid valve FPCV comprises a first intermediate member 36 of a magnetic material having a cylindrical outer side surface and including a first valve seat 43 disposed in the upper end face thereof at the center of the cylindrical configuration, a first fluid path 54 located adjacent to the first valve seat 43 and extending therethrough from the upper to the lower end face, and a second fluid path 44 communicating with a fluid passage 43a of the first valve seat 43 and extending in a direction away from the center;

a first end member 35 of a magnetic material having a cylindrical outer side surface and including a second valve seat 45 disposed at the center of the cylindrical configuration and a first port (low pressure input port) 46 communicating with a fluid passage 45a of the second valve seat 45;

a first non-magnetic cylindrical plunger enclosure member 34 having its one end fastened to the upper end face of the first intermediate member 36 and its other end fastened to the first end member 35 and having a plunger receiving space which communicates with the first and the second valve seat 43, 45 and the first fluid path 54 and which has a center axis which passes through the first and the second valve seat 43, 45;

a first plunger 38 of a magnetic material which is disposed within the first plunger enclosure member 34 to divide its interior into a pair of spaces and including a first small ball 41 disposed opposite to the first valve seat 43 to close the opening 43a thereof, a second small ball disposed opposite to the second valve seat 45 to close the opening 45a thereof and a first bypass path 52 which provides a communication between the pair of divided spaces;

a first coiled compression spring 39 for urging the first plunger 38 upward;

a first electrical coil 31 wrapped around a bobbin 32 which is disposed on the first plunger enclosure member 34;

a first, cylindrical yoke 37 of a magnetic material disposed laterally outside the first electrical coil 31 and having its one end fastened to the first intermediate member 36 and its other end fastened to the first end member 35;

a second end member 76 of a magnetic material having a cylindrical outer side surface and disposed opposite to the other surface of the first intermediate member 36 and including a third valve seat 83 having a fluid passage 83a disposed at the center of the cylindrical configuration and an orifice 83b of a reduced diameter disposed adjacent thereto, a third port (output port) 85 which communicates with the fluid passage 83a and the orifice 83b of the third valve seat 83, and a second port (high pressure input port) 84;

a second, non-magnetic cylindrical plunger enclosure member 74 having its one end fastened to the lower end of the first intermediate member 36 and its other end fastened to the second end member 76 and having a plunger receiving space which communicates with the first fluid path 54, and the opening 83a and the orifice 83b of the third valve seat 83 and having a center axis which passes through the opening 83a;

a second plunger 78 of a magnetic material which is disposed within the second plunger enclosure member 74 to divide its interior into a pair of spaces and including a third small ball 81 disposed opposite to the third valve seat 83 to close the opening 83a thereof and a second bypass path 90 which provides a communication between the pair of divided spaces;

a second coiled compression spring 79 for urging the second plunger 78 upward;

a second electrical coil wrapped around a bobbin 72 which is disposed on the second plunger enclosure member 74 with a non-magnetic cylindrical seal member 82 interposed therebetween;

a second intermediate member 75 of a magnetic material having a cylindrical outer side surface and including an opening in its top at the center of the cylindrical configuration through which the second plunger enclosure member 74 extends and another opening of a greater diameter in its bottom which coaxially continues to the first mentioned opening, and a third bypass path 75b which provides a communication between the bottom opening and the second fluid path 74, with the upper end face of the second intermediate member 75 being fastened to the first intermediate member 36;

and a second yoke 77 of a magnetic material disposed laterally outside the second electrical coil 71 and having its one end fastened to the second intermediate member 75 and its other end fastened to the second end member 76.

Figure 2:
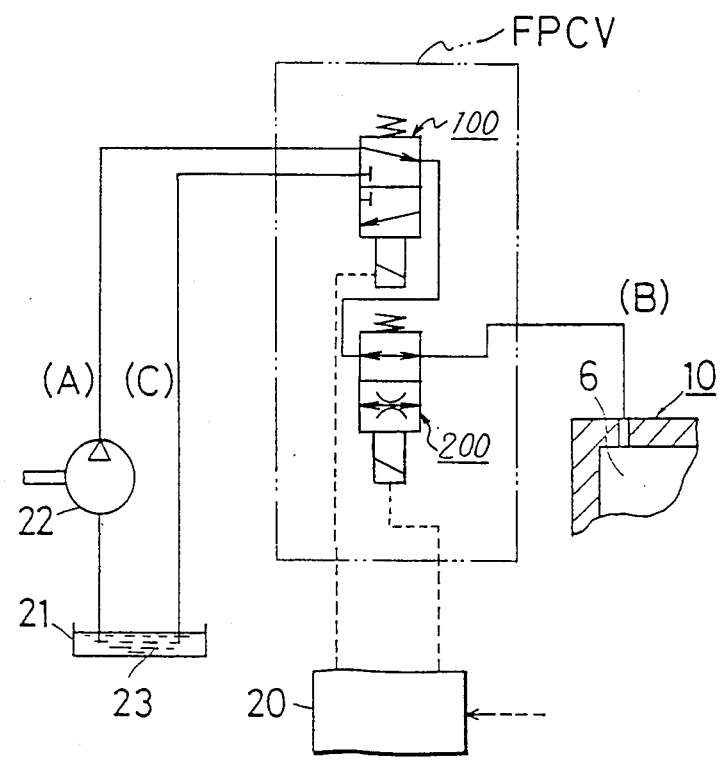
FIG. 2 is a schematic diagram illustrating the general arrangement of the fluid pressure controlling solenoid valve according to the invention.

The upper end of the non-magnetic seal member 82 is fitted into the opening in the bottom of the second intermediate member 75, and the second port 84 communicates with the second fluid path 44 through a gap defined between the second plunger enclosure member 74 and the non-magnetic seal 82 and through the third bypass passage 75b. The first port 46 is connected to the drain C (see FIG. 2) of fluid sources 21, 22, the second port 84 is connected to a high pressure port A, and the third port 85 is connected to the brake pressure controlling chamber 6 of the brake pressure regulator valve assembly 10.

The fluid path switching solenoid valve 100 is constructed as a three port two position switching solenoid valve. Specifically, the first electrical coil 31 is disposed on the bobbin 32 to define a solenoid 53. The plunger enclosure member or sleeve 34 which is constructed of a non-magnetic material is fitted inside the bobbin 32, and the first end member 35 secures one end of the bobbin 32 and the sleeve 34 while the other end of the bobbin 32 and the sleeve 34 is secured to the first intermediate member 36. The first yoke 37 which is formed of a material which exhibits a reduced reluctance is held between the first end member 35 and the first intermediate member 36 in order to define a magnetic path of a reduced reluctance.

The first plunger 38 which is fitted into the sleeve 34 is substantially in the form of a triangular prism having its three apices, as viewed in cross section, rounded. The first plunger 38 is formed with a recess 38a toward the first intermediate member 36, in which the first coiled compression spring 39 is disposed to act between the intermediate member 36 and the plunger 38. Mounted in the recess 38a is one end of a valve auxiliary member 30, to the other end of which is brazed the first valve member or small ball 41. The second valve member or small ball 42 is brazed to the other end of the plunger 38. The first intermediate member 36 is provided with the first valve seat 43 at a location opposite to the ball 41, and the valve seat 43 is formed with the second fluid path 44 connected to the second port 84 of the flow rate regulating solenoid valve 200. The first end member 35 is provided with the second valve seat 45 at a location opposite to the second ball 42, and the opening 45a of the second valve seat 45 communicates with the first port 46. The combination of the ball 41 and the first valve seat 43 constitutes a high pressure switching valve while the combination of the second ball 42 and the second valve seat 45 constitutes a low pressure switching valve. It will be noted that an O-ring 47 seals between the first end member 35 and the sleeve 34 while another O-ring 48 seals between the first intermediate member 36 and the sleeve 34. The first bypass path 52 provides a communication between the space around the high pressure switching valve 51 and the space around the low pressure switching valve 50, and also communicates with the first fluid path 54, which represents the output port of the solenoid valve 100 and also the input port of the solenoid valve 200.

The flow rate regulating solenoid valve 200 is constructed as a two port two position flow rate regulating solenoid valve. Specifically, the second electrical coil 71 is disposed on the bobbin 72 to define a solenoid 73. The second plunger enclosure member or sleeve 74 formed of a non-magnetic material is fitted inside the bobbin 72, and one end of the sleeve 74 is secured as by brazing to the first intermediate member 36 while the other end of the sleeve 74 is secured as by brazing to the second end member 76. Accordingly, the inside and the outside of the sleeve 74 are sealed from each other. The seal member 82 of a non-magnetic material is disposed between the inside of the bobbin 72 and the sleeve 74, and is spaced from the sleeve 74. An O-ring 63 seals between one end of the seal member 82 and the second end member 76. The other end of the seal member 82 is secured as by brazing to the second intermediate member 75, to which one end of the bobbin 72 is secured. An O-ring 61 provides a seal between the second intermediate member 75 and the first intermediate member 36. The second yoke 77 formed of a material which exhibits a reduced reluctance is held between the second intermediate member 75 and the second end member 76 in order to define a magnetic path of a reduced reluctance.

The second plunger 78 which is fitted inside the sleeve 74 is substantially in the form of a triangular prism with three apices, as viewed in cross section, rounded, in the similar manner as the first plunger 38. The plunger 78 is provided with a recess 78a toward the second end member 76, in which the second coiled compression spring 79 is disposed to act between the third valve seat 83 defined on the second end member and the recess 78a. One end of a valve auxiliary member 80 is mounted in the recess 78a while its other end is brazed with the third valve member or the third small ball 81. The third valve seat 83 is formed with the opening 83a of an increased diameter which can be opened or closed by the third ball 81, and with the orifice 83b of a reduced diameter which remains open. A filter 86 is disposed on the backside of the third valve seat 83, or on the opposite side which is disposed for abutment by the second ball 81, and the opening 83a and the orifice 83b open into the filter. Accordingly, the internal space within the sleeve 74 communicates with the third port through the opening 83a and the orifice 83b formed in the third valve seat 83 and through the filter 86. The second fluid path 44 communicates with the second port 84 through a clearance between the sleeve 74 and the seal member 82 and through the third bypass path 75b formed in the second intermediate member 75.

The first fluid path 54, which represents the output port of the solenoid valve 100, communicates with the internal space within the sleeve 74, and thence communicates with the space around the third ball 81 through the second bypass path 90. A spacer 62 is disposed on the side of the sleeve 74 located toward the intermediate member 36 in order to prevent the second plunger 78 from closing the first fluid path 54 on the side nearer the first intermediate member 36.

The combination of the third ball 81 on the second plunger 78 and the opening 83a of the third valve seat 83 constitutes an output switching valve 91. When the second plunger 78 opens the valve 91, the combination of the opening 83a having an increased opening diameter and the orifice 83b having a reduced diameter function to limit the flow rate through the third output port 85. On the other hand, when the valve 91 is closed, the orifice 83b of a reduced diameter limits the flow rate through the third output port 85.

The fluid path switching solenoid valve 100 and the flow rate regulating solenoid valve 200 are secured together integrally by a cylindrical casing 95. The second end member 76 is fastened to the brake pressure regulator valve assembly 10, and the duct which provides an interconnection therebetween is sealed by O-rings 64 and 65. The use of the cylindrical casing 95 depends on the construction of an environment in which the both solenoid valves 100 and 200 are disposed.

The first intermediate member 36, the second intermediate member 75, the first yoke 37 and the second yoke 77 have their peripheral portions partly removed, whereby a space is defined inside the casing 95 including a depression 36a formed by removal of part of the first intermediate member 36 and a depression 75a formed by removal of part of the second intermediate member 75. An electrical cord 96 has its one end connected to terminals associated with the first and the second electrical coil 31, 71 within this space. The cord 96 passes through a rubber bushing 96 fitted in an aperture in the casing 95 so as to be taken out of the apparatus FPCV.

The fluid path/flow rate switching solenoid valve constructed in the manner mentioned above operates as follows: It is assumed that the second port (high pressure port) 84 is connected to the high pressure port of the pump 22 shown in FIG. 2, the third port (output port) 85 is connected to the brake pressure controlling chamber 6 of the brake pressure regulator valve assembly 10, and the first port (low pressure port) 46 is connected to the drain of the oil tank 21.

Figure 3:
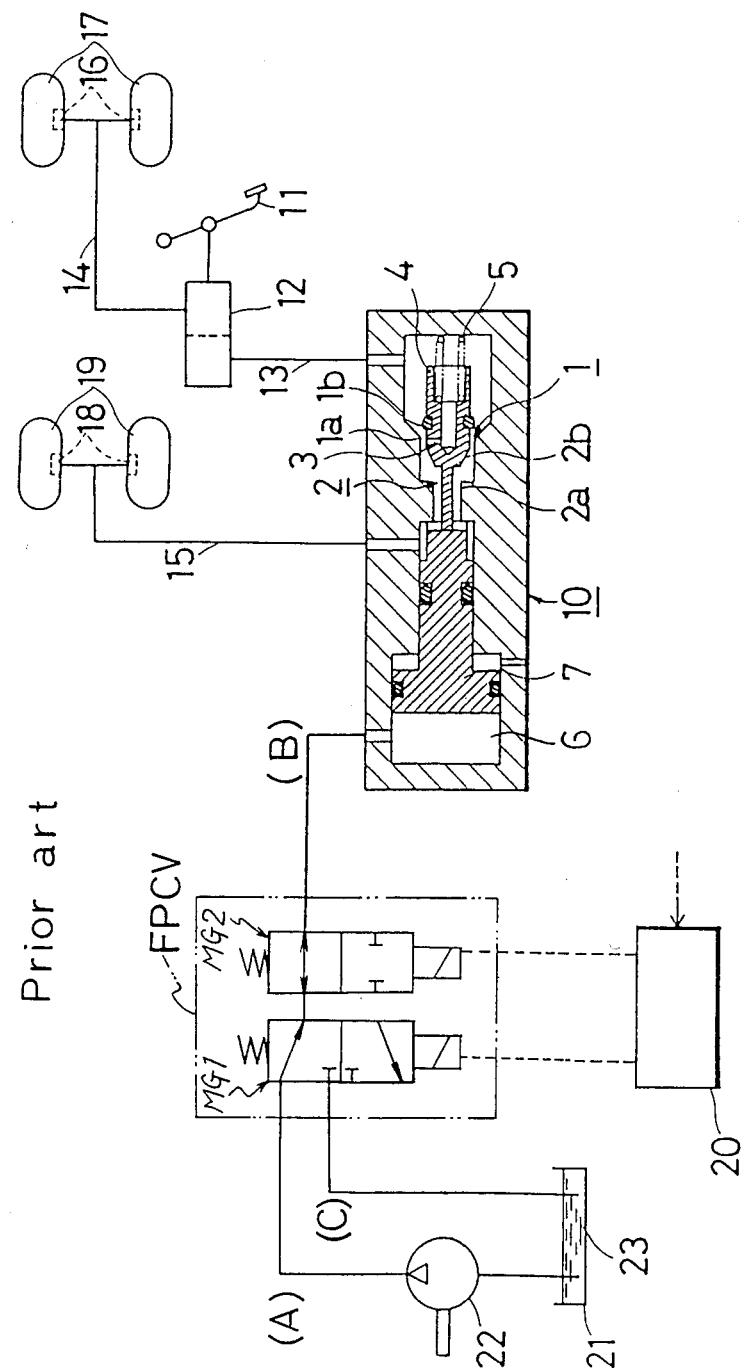
FIG. 3 is a schematic diagram of an antiskid control unit incorporating a conventional fluid pressure controlling solenoid valve.

Initially when the solenoids 53, 73 of the both solenoid valves 100, 200 are deenergized (rapid booster mode), the oil pressure of the second port 84 passes through the clearance between the seal member 82 and the sleeve 74, through the third bypass path 75b formed in the second intermediate member 75 and the second fluid path 44 of the first intermediate member, and thus is fed to the opening 43a of the first valve seat 43. Since the opening 43a is open while the opening 45a of the second valve seat 45 is closed, the oil pressure in the internal space of the sleeve 34 is raised as is the oil pressure within the first fluid path 54 and in the internal space of the sleeve 74. Since the third ball 81 assumes its upper position to maintain the opening 83a of the third valve seat 53 open, the oil flows through the opening 83a and the orifice 83b of a reduced diameter and then through the filter 86 and the third port 85 to be introduced into the brake pressure controlling chamber 6. Thus when the solenoids 53, 73 of the both solenoid valves 100, 200 are deenergized, the piston 7 (see FIG. 3) is driven to the right until it comes to a stop at its right-most position shown in FIG. 3. If the rapid booster mode is entered from the rapid reduction or slow reduction mode, which will be described later, the movement of the piston 7 to the right achieves a relatively rapid increase in the brake pressure.

When the solenoid 73 of the solenoid valve 200 is energized alone (slow booster mode), the opening 83a having an increased diameter of the third valve seat 83 is closed, whereby the piston 7 moves to the right at a reduced rate, allowing the brake pressure to rise at a slow rate.

When the solenoid 53 of the solenoid valve 100 is energized while the solenoid 73 of the solenoid valve 200 is maintained deenergized (rapid reduction mode), the opening 43a of the first valve seat 43 is closed, the opening 45a of the second valve seat 45 is open and the opening 83a of the third valve seat 83 is open, whereby the oil pressure from the second port 84 is not fed to the internal space within the sleeve 34, which in turn communicates with the first port 46. Accordingly, the oil in the brake pressure controlling chamber 6 is displaced into the drain of the oil tank 21 through the third port 85, the filter 86, the opening 83a and the orifice 83b, the second bypass path 90, the first fluid path 54, the first bypass path 52, the second valve seat 45 and the first port 46. Thus, when only the solenoid 53 of the solenoid valve 100 is energized, the oil pressure within the brake pressure controlling chamber 6 is reduced, causing the piston 7 to move to the left to reduce the brake pressure. As the oil flows through the opening 83a and the orifice 83b, the reduction in the oil pressure and hence in the brake pressure occurs rapidly.

When the solenoids 53 and 73 of the both solenoid valves 100 and 200 are energized (slow reduction mode), the opening 83a of the third valve seat 83 is closed, so that the piston 7 moves to the left at a reduced rate, causing a reduction in the brake pressure at a slower rate.

A filter 94 which is mounted on the second port 84 prevents the ingress of any dust contained in the oil which is fed from the fluid sources (21, 22) into the apparatus FPCV, thus allowing a dust-free oil to be supplied to the brake pressure controlling chamber 6. The filter 86 which is mounted on the bottom of the third valve seat 83 removes any dust from the oil that is withdrawn from the brake pressure controlling chamber 6, thus returning dust-free oil to the fluid source. These filters 94 and 86 serve preventing a plugging of the openings 43a, 45a and 83a of the first, the second and the third valve seat as well as the orifice 83b.

While a specific preferred embodiment of the invention has been shown and described in detail, it should be understood that a number of changes, substitutions and modifications can be made therein without departing from the scope of the invention as defined in the appended claims. By way of example, instead of providing the first end member 35 with a central circular opening (see FIG. 1) which receives the upper end of the sleeve 34, the first end member may include a land which projects into the sleeve 34. In a corresponding manner, instead of providing the land shown in FIG. 1 which projects into the sleeve 34, the first intermediate member 36 may be provided with a central circular opening which receives the lower end of the sleeve 34. Alternatively, the first coiled compression spring 39 may be interposed between the first end member 35 and the first plunger 38, whereby the solenoid valve 100 may be arranged so that the first valve seat 43 is closed and the second valve seat is open when the first electrical coil 31 is deenergized. Similarly, the solenoid valve 100 can also be altered so that the opening 83a of the third valve seat is closed when the second electrical coil 71 is deenergized. As further alternatives, the second port 84 may be formed in the first end member 35, and the third bypass path may be defined outside the sleeve 34 for providing a communication between the second port 84 and the second fluid path 44, or the first and the second intermediate member 36, 75 may be substituted by a single intermediate member of a configuration which represents a combined configuration of these members.

What is claimed is:

1. A fluid pressure controlling solenoid valve comprising an intermediate member of a magnetic material having a cylindrical outer side surface and including a first valve seat disposed in its upper end face and located at the center of the cylindrical configuration, a first fluid path disposed adjacent to the first valve seat and extending therethrough from the upper to the lower end face thereof, and a second fluid path communicating with the fluid passage of the first valve seat and extending in a direction away from the center;

a first end member of a magnetic material having a cylindrical outer side surface and including a second valve seat disposed at the center of the cylindrical configuration and a first port communicating with the fluid passage of the second valve seat;

a second port communicating with the second fluid path;

a first cylindrical plunger enclosure member having its one end fastened to the upper end face of the intermediate member and its other end fastened to the first end member and having a plunger receiving space which communicates with the first and the second valve seat and the first fluid path, with the center axis of the space passing through the first and the second valve seat;

a first plunger of a magnetic material disposed within the first plunger enclosure member to divide its interior into a pair of spaces and including a first valve member disposed opposite to the first valve seat to close the opening thereof, a second valve member disposed opposite to the second valve seat to close the opening thereof and a bypass path which provides a communication between the pair of divided spaces;

first spring means for urging the first plunger in a direction along the center axis of the first plunger enclosure member;

a first electrical coil disposed around the first plunger enclosure member;

a first yoke of a magnetic material disposed laterally outside the first electrical coil and having its one end fastened to the intermediate member and its other end fastened to the first end member;

a second end member of a magnetic material having a cylindrical outer side surface and including a third valve seat disposed at the center of the cylindrical configuration in opposing relationship with the other surface of the intermediate member and a third port communicating with the fluid passage of the third valve seat;

a second, cylindrical plunger enclosure member having its one end fastened to the lower end face of the intermediate member and its other end fastened to the second end member and having a plunger receiving space which communicates with the first fluid path and the third valve seat, with a center axis of the space passing through the third valve seat;

a second plunger of a magnetic material disposed within the second plunger enclosure member to divide its interior into a pair of spaces and including a third valve member disposed opposite to the third valve seat to close the opening thereof and a bypass path which provides a communication between the pair of divided spaces;

second spring means for urging the second plunger in a direction along the center axis of the second plunger enclosure member;

a second electrical coil disposed around the second plunger enclosure member;

and a second yoke of a magnetic material disposed laterally outside the second electrical coil and having its one end fastened to the intermediate member and its other end to the second end member.

2. A fluid pressure controlling solenoid valve according to claim 1 in which the second end member 76 has an orifice of a diameter less than that of the fluid passage of the third valve seat and communicating with the second plunger receiving space and the third port.

3. A fluid pressure controlling solenoid valve according to claim 2 in which the first spring means comprises a coiled compression spring interposed between the intermediate member and the first plunger to urge the first plunger in a direction to close the opening of the second valve seat, and the second spring means comprises a coiled compression spring interposed between the second end member and the second plunger for urging the second plunger in a direction to open the opening of the third valve seat.

4. A fluid pressure controlling solenoid valve according to claim 3 in which the second port is formed in the second end member and communicates with the second fluid path through a fluid path which is formed adjacent to the outer side of the second plunger enclosure member.

5. A fluid pressure controlling solenoid valve according to claim 1 in which both the first and the second yoke are cylindrical in configuration, and in which the radius of the cylindrical outer side surface of the intermediate member, the radius of the cylindrical outer side surface of the first and the second end member and the radius of the cylindrical outer side surface of the first and the second yoke are substantially equal to each other, and further including a cylindrical casing member having its one end secured to the first end member and its other end secured to the second end member for enclosing the cylindrical outer side surfaces of the first and the second end member, the intermediate member and the first and the second yoke.

6. A fluid pressure controlling solenoid valve according to claim 5 in which the cylindrical outer side surface of the intermediate member is partly removed to define a depression where one end of an electrical cord is connected to terminals of the first and the second electrical coil, the cylindrical casing member being formed with a hole located adjacent to the depression and through which the cord passes.

* * * * *